US009426683B2

(12) United States Patent
Sandberg et al.

(10) Patent No.: US 9,426,683 B2
(45) Date of Patent: Aug. 23, 2016

(54) METHOD AND BASE STATION FOR PROVIDING AN ESTIMATE OF INTERFERENCE AND NOISE POWER OF AN UPLINK RESOURCE BLOCK

(75) Inventors: David Sandberg, Solna (SE); Mats Åhlander, Täby (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 29 days.

(21) Appl. No.: 14/398,273

(22) PCT Filed: May 2, 2012

(86) PCT No.: PCT/SE2012/050452
§ 371 (c)(1),
(2), (4) Date: Oct. 31, 2014

(87) PCT Pub. No.: WO2013/165283
PCT Pub. Date: Nov. 7, 2013

(65) Prior Publication Data
US 2015/0124632 A1    May 7, 2015

(51) Int. Cl.
| H04B 7/005 | (2006.01) |
| H04W 24/08 | (2009.01) |
| H04B 7/08 | (2006.01) |
| H04B 17/345 | (2015.01) |
| H04W 72/08 | (2009.01) |
| H04L 5/00 | (2006.01) |

(52) U.S. Cl.
CPC ............ H04W 24/08 (2013.01); H04B 7/0854 (2013.01); H04B 17/345 (2015.01); H04W 72/082 (2013.01); H04L 5/0062 (2013.01); H04L 5/0094 (2013.01)

(58) Field of Classification Search
CPC .......................... H04W 24/08; H04W 72/082
USPC ..................... 370/278–347; 375/232–260
See application file for complete search history.

(56) References Cited

U.S. PATENT DOCUMENTS

| 8,855,257 B2 * | 10/2014 | Mujtaba | H04B 7/0417 375/260 |
| 2012/0099544 A1 * | 4/2012 | Pajukoski | H04L 5/0032 370/329 |
| 2012/0243502 A1 * | 9/2012 | Lindqvist | H04J 11/0046 370/330 |

FOREIGN PATENT DOCUMENTS

WO       2011071426 A1    6/2011

OTHER PUBLICATIONS

Dao, Ngoc-Dung et al., "Receive Antenna Selection Techniques for Femtocell Uplink Interference Mitigation", IEEE 2010, 21st International Symposium on Personal, Indoor and Mobile Radio Communications Workshops, 180-184.

*Primary Examiner* — Iqbal Zaidi
(74) *Attorney, Agent, or Firm* — Patent Portfolio Builders, PLLC (57) ABSTRACT

A method in a base station (110) for providing an estimate of interference and noise power of an uplink resource block. The base station (110) is comprised in a cellular communications network (100). The base station (110) receives (401, 901) on multiple antenna elements (112a-c) of a receiver antenna (112) a signal comprising interference and noise. The base station (110) calculates (402, 902) an interference and noise covariance matrix for the resource block based on the received signal. The base station (110) then calculates (903, 403) the estimate based on the calculated interference and noise covariance matrix, the number of the multiple antenna elements (112a-c) of the receiver antenna (112) and a channel covariance matrix for a virtual user equipment. The provided estimate enables an interference and noise measure when Interference Rejection Combining (!RC) is applied in the uplink. Thereby more efficient use of uplink Frequency Selective Scheduling (FSS) together with uplink IRC and improved performance in the cellular communications network is enabled.

16 Claims, 9 Drawing Sheets

METHOD AND BASE STATION FOR PROVIDING AN ESTIMATE OF INTERFERENCE AND NOISE POWER OF AN UPLINK RESOURCE BLOCK

TECHNICAL FIELD

Embodiments herein relate to a method in a base station and a base station. In particular embodiments herein relate to provision of an estimate of interference and noise power of an uplink resource block.

BACKGROUND

Communication devices such as User Equipments (UE) are also known as e.g. mobile terminals, wireless terminals and/or mobile stations. A user equipment is enabled to communicate wirelessly in a cellular communications network, wireless communications system, or radio communications system, sometimes also referred to as a cellular radio system or cellular networks. The communication may be performed e.g. between two user equipments, between a user equipment and a regular telephone and/or between a user equipment and a server via a Radio Access Network (RAN) and possibly one or more core networks, comprised within the cellular communications network.

The user equipment may further be referred to as a mobile telephone, cellular telephone, laptop, Personal Digital Assistant (PDA), tablet computer, surf plate, just to mention some further examples. The user equipment in the present context may be, for example, portable, pocket-storable, hand-held, computer-comprised, or vehicle-mounted mobile devices, enabled to communicate voice and/or data, via the RAN, with another entity, such as another user equipment or a server.

The cellular communications network covers a geographical area which is divided into cell areas, wherein each cell area being served by a base station, e.g. a Radio Base Station (RBS), which sometimes may be referred to as e.g. "eNB", "eNodeB", "NodeB", "B node", or BTS (Base Transceiver Station), depending on the technology and terminology used. The base stations may be of different classes such as e.g. macro eNodeB, home eNodeB or pico base station, based on transmission power and thereby also cell size. A cell is the geographical area where radio coverage is provided by the base station at a base station site. One base station, situated on the base station site, may serve one or several cells.

Further, each base station may support one or several communication technologies. The base stations communicate over the air interface operating on radio frequencies with the user equipment within range of the base stations.

In some RANs, several base stations may be connected, e.g. by landlines or microwave, to a radio network controller, e.g. a Radio Network Controller (RNC) in Universal Mobile Telecommunications System (UMTS), and/or to each other. The radio network controller, also sometimes termed a Base Station Controller (BSC) e.g. in GSM, may supervise and coordinate various activities of the plural base stations connected thereto. GSM is an abbreviation for Global System for Mobile Communications (originally: Groupe Special Mobile).

In 3rd Generation Partnership Project (3GPP) Long Term Evolution (LTE), base stations, which may be referred to as eNodeBs or even eNBs, may be directly connected to one or more core networks.

UMTS is a third generation mobile communication system, which evolved from the GSM, and is intended to provide improved mobile communication services based on Wideband Code Division Multiple Access (WCDMA) access technology. UMTS Terrestrial Radio Access Network (UTRAN) is essentially a radio access network using wideband code division multiple access for user equipments. The 3GPP has undertaken to evolve further the UTRAN and GSM based radio access network technologies.

In the context of this disclosure, the expression downlink (DL) is used for the transmission path from the base station to the user equipment. The expression uplink (UL) is used for the transmission path in the opposite direction i.e. from the user equipment to the base station.

Cellular communication networks in general evolve towards higher data rates, together with improved capacity and coverage. In the 3GPP standardization body, technologies like GSM, HSPA and LTE have been and are currently developed, where LTE is the latest technology standardised. LTE uses an access technology based on OFDM (Orthogonal Frequency Division Multiplexing) for the downlink and Single Carrier FDMA (SC-FDMA) for the uplink. The resource allocation to user equipments on both DL and UL is performed adaptively by the concept of fast scheduling, taking into account the instantaneous traffic pattern, radio propagation characteristics of each user equipment and the interference situation in the cell. Assigning resources in both DL and UL is performed in a scheduler situated in the eNodeB.

In particular interference from neighbouring cells has impact in LTE and other cellular communications networks, and there is a number of techniques for reducing and managing interference, including for example time and frequency scheduling, frequency selective scheduling, interference control and interference cancellation and reduction, just to mention some. In order to improve performance and continue evolving towards higher data rate and improved efficiency it become increasingly desirable to use more than one such technique at the same time, in the same system. However, it is not automatically so that different techniques by default are compatible with each other. Also, different techniques may negatively affect each other in various ways if used at the same time, at least without some further adaptation.

SUMMARY

It is therefore an object of embodiments herein to enable improved performance in cellular communications networks, such as LTE.

According to a first aspect of embodiments herein, the object is achieved by a method in in a base station for providing an estimate of interference and noise power of an uplink resource block. The base station is comprised in a cellular communications network. A signal comprising interference and noise is received on multiple antenna elements of a receiver antenna. An interference and noise covariance matrix is calculated for the resource block based on the received signal. The estimate is calculated based on the calculated interference and noise covariance matrix, the number of antenna elements of the multiple antenna elements and a channel covariance matrix for a virtual user equipment.

According to a second aspect of embodiments herein, the object is achieved by a base station for providing an estimate of interference and noise power of an uplink resource block. The base station is comprised in a cellular communications network. The base station comprises a receiver antenna configured to receive, on multiple antenna elements thereof, a signal comprising interference and noise. The base station further comprises a first calculating circuitry, configured to calculate an interference and noise covariance matrix for the resource block based on the received signal. The base station also comprises a second calculating circuitry, configured to calculate the estimate based on the calculated interference and noise covariance matrix, the number of the multiple antenna elements of the receiver antenna and a channel covariance matrix for a virtual user equipment.

Embodiments herein enable through the estimate, provision of an interference and noise measure when Interference Rejection Combining (IRC) is applied in the uplink. This e.g. enables more efficient use of uplink Frequency Selective Scheduling (FSS) together with uplink IRC. The covariance matrix for the virtual user equipment, instead of a channel covariance matrix for a real user equipment as typically is the case, has some particular advantages connected to it. It enables to provide the estimate for a resource block that for the moment is not used in the uplink by any real user equipment, but that still is of interest to consider for scheduling, i.e. assignment to a user equipment. The covariance matrix for the virtual user equipment also enables the estimate, despite corresponding to an IRC situation, to be calculated in the base station per subband and need be calculated in the base station per user equipment as typically would be expected when relating to uplink IRC. This enables a less complex and less computational intense implementation and may also facilitate implementation in a base station already supporting FSS.

Hence, embodiments herein enable improved performance in the cellular communications network.

BRIEF DESCRIPTION OF THE DRAWINGS

Examples of embodiments herein are described in more detail with reference to the appended schematic drawings, in which.

DESCRIPTION

Figure 1:
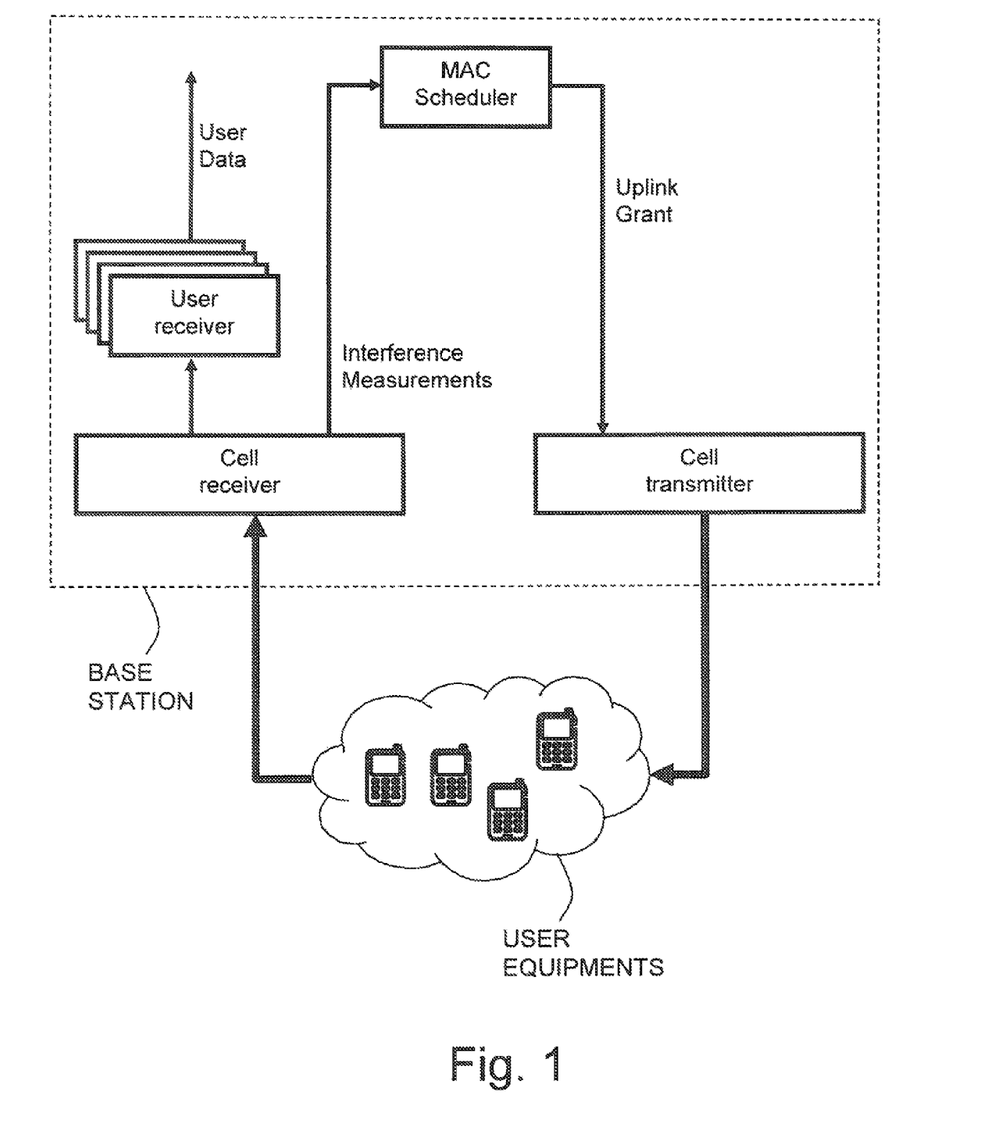
FIG. 1 schematically shows a block diagram illustrating how interference is measured in a typical configuration.
Figure 2:
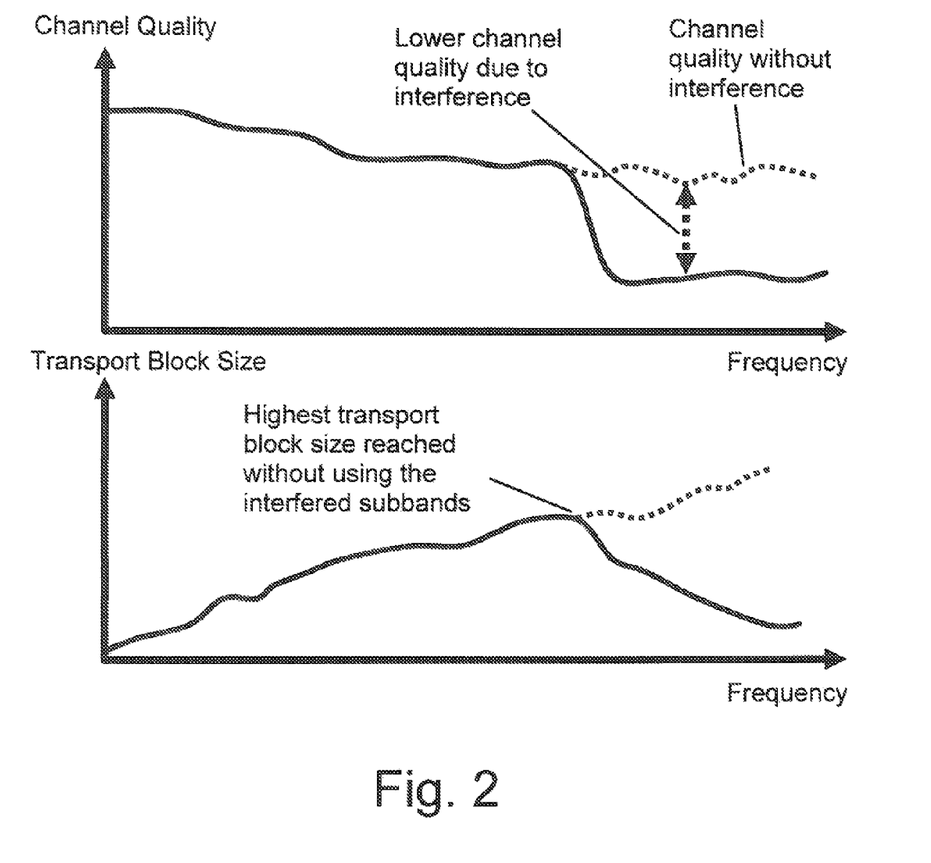
FIG. 2 is schematic diagrams depicting an example from LTE in the uplink.

As part of the development towards embodiments herein, the problem indicated in the background section will first be further discussed, with reference to FIGS. 1-2.

LTE uses an access technology based on OFDM (Orthogonal Frequency Division Multiplexing) for the downlink and Single Carrier FDMA (SC-FDMA) for the uplink. The resource allocation to user equipments on both downlink and uplink is performed adaptively by the concept of fast scheduling, taking into account the instantaneous traffic pattern, radio propagation characteristics of each user equipment and the interference situation in the cell. The situation is similar also for other type of systems, such as Worldwide Interoperability for Microwave Access (WiMAX).

Interference Rejection Combining (IRC) is a method used to enhance the transmission capacity by suppressing interference. Multiple receive antenna elements are utilized to achieve this. The interference mitigated by IRC could be inter-cell interference, self-interference or interference from outside the cellular communications network, such as non-LTE interference. At least when interference affects at least one reference signal, such as pilot signal or symbol, there is a potential for IRC gain.

IRC uses an antenna combining algorithm called linear MMSE (Minimum Mean Square Error) combining and may be viewed as an extension of the more common Maximal Ratio Combining (MRC) algorithm. Instead of selecting the antenna weights to maximize the received signal-to-noise ratio after antenna combining, the antenna weights are selected so that the interferer or interferers are suppressed. In terms of receiver side beamforming this corresponds to a receiver beam with high attenuation in the direction of the interferer, rather than focusing the receiver beam in the direction of the target signal.

In the case of a single dominating interferer a received signal may be expressed as $$\bar{r}=\bar{h}\cdot s+\bar{h}_I\cdot s_I+\bar{n}$$

where $\bar{h}$ is a vector of complex channel gains between the wanted signal transmitter and antenna elements of the receive antenna, $\bar{h}_I$ is the corresponding gains for the interferer, s is the wanted signal, $s_I$ is the interfering signal and $\bar{n}$ is the noise.

In the receiver the received signal $\bar{r}$ is used to create an estimate of the transmitted signal s, called ŝ. This is done using linear antenna combining according to $$\hat{s}=\bar{w}^H\cdot\bar{r}$$

where $\bar{w}^H$ denotes the Hermitian transpose of the antenna combining weights.

It is clear that when the antenna weight vector $\bar{w}$ is selected such that $\bar{w}^H\cdot h_I=0$ the interfering signal will be completely suppressed. This may, however, lead to severe noise amplification depending on the properties of the complex channel of the interferer, $h_I$.

A better approach is to select the antenna weight vector $\bar{w}$ to minimize the mean square error between the transmitted signal and its estimate in the receiver, i.e.

$$\epsilon E\{|\hat{s}-s|^2\}$$

It is also known as Minimum Mean Square Error combining.

Frequency Selective Scheduling (FSS) may be used to avoid scheduling users on parts of the system bandwidth where high interference levels are experienced. When FSS is employed, the channel quality per subband is estimated. The channel quality estimation is typically based on both the frequency response of the fading channel as well as the interference level per subband. The interference is measured on a cell receiver, or cell processing, level in the base station, which provides input to further processing per user equipment in the base station. A scheduler in the base station may then decide on a per subband basis if a subband should be scheduled to a certain user equipment or not. This will imply that heavily interfered subbands may be left unscheduled and thus not used if they do not provide a throughput increase.

FIG. 1 schematically shows an exemplifying block diagram illustrating how interference typically is measured when FSS is applied in the uplink. The measurements are performed on a signal received by a receiver antenna (not shown in FIG. 1) and processed in a block named cell receiver in the base station. This is straightforward since the scheduler considers information relating to resource blocks and sub-bands, which are available on a cell receiver level, i.e. before processing the information per user equipment in the base station, illustrated by the user receiver blocks in FIG. 1. Hence the measurements are on a cell receiver level and not on a user receiver level in the base station. The result from the measurement is forwarded to a scheduler which, based on the received measurements, assign resources in the uplink to the user equipments and sends a respective so called uplink grant to inform the respective user equipment about its assigned resource.

FIG. 2 is schematic diagrams depicting an example from LTE in the uplink, where SC-FDMA is used. Due to the single carrier properties of SC-FDMA, interference that is included in the allocation will be distributed over all subcarriers in the allocation. This interference will result in a lower usable transport block size, as illustrated in FIG. 2. Hence, in this situation a scheduler with FSS will typically avoid the interfered subbands in order to optimize the transport block size and thereby the throughput.

As understood from the above, IRC is applied in the base station per user equipment, i.e. on a user receiver level in the base station in terms for facilitating comparison with the above FSS example discussed in connection with FIG. 1. When FSS is implemented at the same time as IRC and thus, according to the above, will base scheduling decision on interference measurements in the base station on a cell receiver level, it will not take into account if IRC is applied or not. Hence, even if IRC is used, an FSS enabled scheduler may still avoid scheduling users on interfered subbands. This is even though nearly all interference may be suppressed by IRC. In other words, IRC gains will not be taken into consideration by FSS and an interfered subband therefore risk not to be used and not be scheduled although IRC would make it fully usable. This makes uplink IRC and uplink FSS less efficient than desirable when used together. Solving this problem would thus improve performance.

Figure 3A:
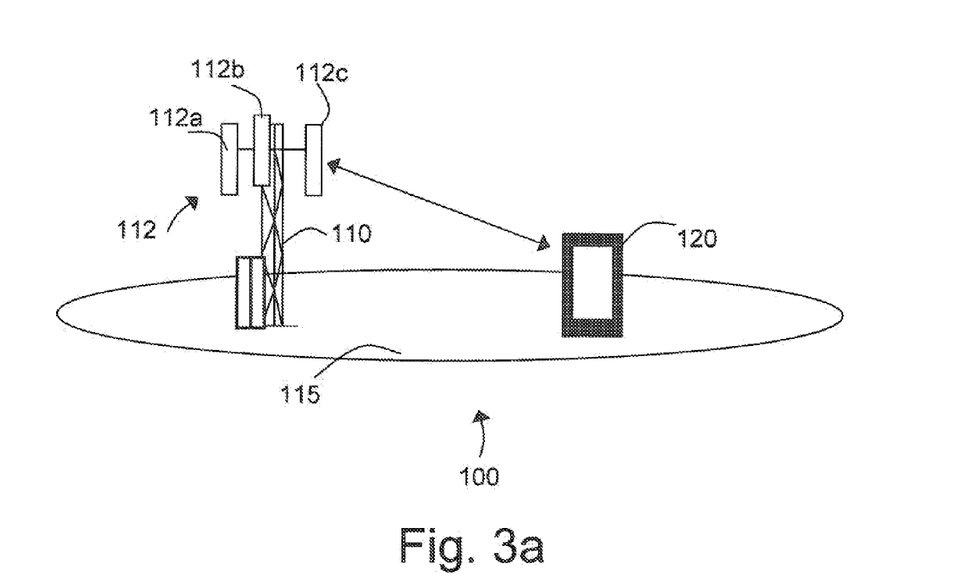
FIG. 3a is a schematic block diagram depicting an example of a cellular communication network.

FIG. 3a schematically depicts an example of a cellular communication network 100, which may be an LTE cellular network, or e.g. a WiMAX cellular network. The radio communications system 100 may comprise a radio access network and a core network. In an LTE-based or related system, the radio access network may correspond to what commonly is referred to as the Evolved UMTS Terrestial Radio Access Network (E-UTRAN) and the core network may correspond to what commonly is referred to as the Evolved Packet Core (EPC).

The shown radio communications system 100 comprises a base station 110 serving a cell 115. By a base station serving a cell is here meant the ability to wirelessly send downlink data and/or receiving uplink data via radio communication in the cell to a user equipment comprised therein. The base station 110 may be a eNodeB, but may in other embodiments be of another type and/or be referred to by different names, such as RBS, NodeB, eNB, BTS, depending on technology and terminology used. The base station receives radio signals on a receiver antenna 112 comprising multiple antenna elements 112a-c for receiving the signals. Note that the shown base station 110, receiver antenna 112 and antenna elements 112a-c are only schematic and that real corresponding entities may look very different compared to the schematic figures and also in comparison with each other when of different types, however readily recognizable and identifiable by the skilled person.

The shown radio communications system 100 further comprises a user equipment (UE) 120. The user equipment 120 is located within cell 115 and is served by the base station 110. The user equipment may be a mobile telephone, cellular telephone, laptop, Personal Digital Assistant (PDA), tablet computer, surf plate, just to mention some examples.

Figure 3B:
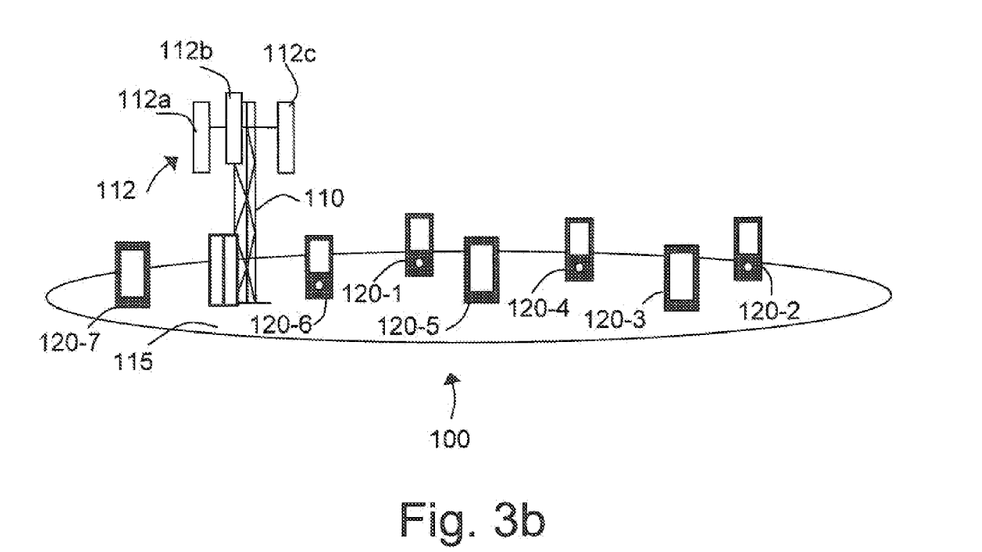
FIG. 3b is a schematic block diagram depicting the cellular communication network with multiple user equipments.

FIG. 3b schematically depicts the cellular communication network 100, the base station 110, the cell 115, but in a more common situation with multiple user equipments (UEs) 120-1 ... 120-7 located in the cell 115 and respectively served by the base station 110. One important task, as mentioned above, is resource allocation to respective one of the multiple user equipments 120-1 ... 120-7, on both downlink and uplink, which typically is performed adaptively by the concept of fast scheduling, taking into account the instantaneous traffic pattern, radio propagation characteristics of each user equipment and the interference situation in the cell 115. Assigning resources in both downlink and uplink is, as mentioned previously, performed in what commonly is referred to as a scheduler (not shown), typically situated in the base station 115.

It should be understood that FIGS. 3a and 3b are merely schematic and that the cellular communications network 100 in reality may comprise several further base stations, cells, user equipment, and other network nodes, which are not shown here.

Figure 4:
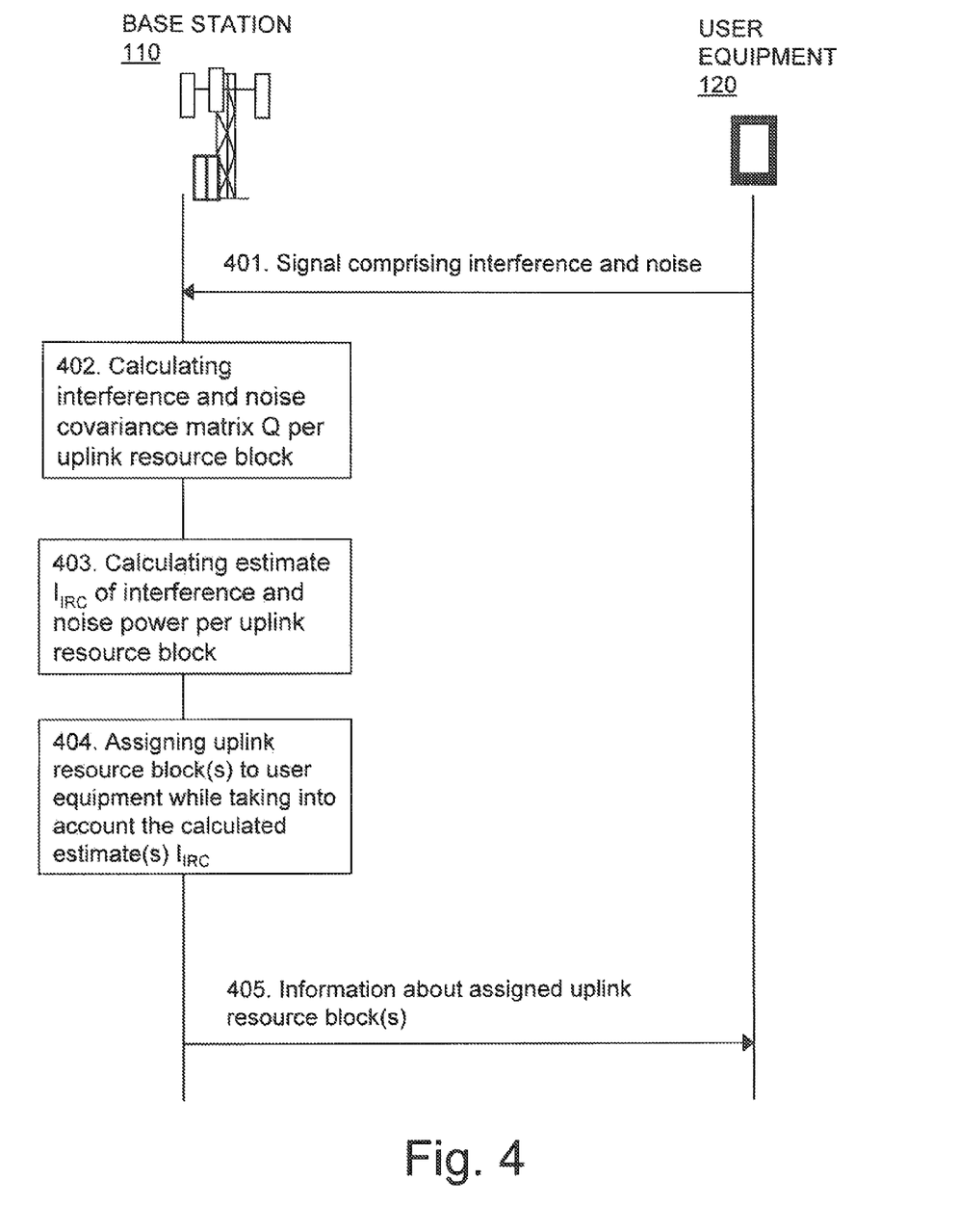
FIG. 4 is a combined signalling diagram and flowchart illustrating embodiments herein.

Embodiments herein for providing an estimate of interference and noise power of an uplink resource block, thereby enabling e.g. efficient use of both FSS and IRC in the uplink, will now be described with reference to the combined signaling diagram and flowchart depicted in FIG. 4.

Action 401

The base station 110 receives on the multiple antenna elements 112a-c of the receiver antenna 112 a signal typically comprising signal energy associated with the user equipment 120, or a respective one of the multiple user equipments 120-1 ... 120-7. In practice the received signal will also comprise interference and noise mixed with the signal energy. The noise and interference may for example be generated by electrical components and interfering users from neighboring cells. In some embodiments there may be no signal energy associated the user equipment 120, or the respective one of the multiple user equipments 120-1 ... 120-7, in the received signal, only the interference and noise. This may be the case if there is no user equipment being served by the base station 110 or if the user equipment 120 is not transmitting in the uplink when the signal is received. However, in most practical circumstances the signal is typically received with one or more user equipments being served by the base station and transmitting in the uplink. The received signal is to be used for providing the estimate of interference and noise power, as will be discussed below.

Action 402

An interference and noise covariance matrix is calculated for the resource block based on the received signal. A detailed example of how the interference and noise covariance matrix may be calculated will be presented separately below. However, the calculating comprises extracting the signal energy associated with user equipment 120, or user equipments 120-1 ... 120-7, from the received signal when this is required. This is typically performed for each subcarrier in the received signal. The result being a residual error for each subcarrier. The residual error may be represented by a residual error vector of size $1 \times N_A$, where $N_A$ is the number of antenna elements of the receiver antenna 112, i.e. in the schematic example shown in FIGS. 3a and 3b $N_A$ would be 3 since there are three receiver antenna elements 112a-c. However, it should be noted that embodiments herein may be used with various number of multiple receiver antenna elements, e.g. with any receiver antenna that enable IRC. The noise and covariance for a resource block may be formed using the residual error vectors of the subcarriers associated with the resource block. The so formed interference and noise covariance matrix is of size $N_A \times N_A$.

Action 403

The estimate is calculated based on the calculated interference and noise covariance matrix, the number of antenna elements, i.e. $N_A$ according to the above, of the receiver antenna 112 and a channel covariance matrix for a virtual user equipment. A detailed example of how the estimate may be calculated will be presented separately below. The virtual user equipment has not direct correspondence to a particular real user equipment and is thus not the user equipment 120, or any of the user equipments 120-1 ... 120-7.

Since the channel covariance matrix for the virtual user equipment may be determined independently of the user equipment 120, or user equipments 120-1 ... 120-7, presently being served by the base station, it need not be calculated, or even determined, in real time per user equipment as else typically would be the case. The channel covariance matrix may even be determined in beforehand, e.g. prior to carrying out the method.

In some embodiments the channel covariance matrix for the virtual user equipment is an identity matrix. This is typically advantageous when the receiver antenna 112 has uncorrelated antenna elements 112a-c.

In some embodiments the channel covariance matrix for the virtual user equipment has been determined statistically based on calculated channel covariance matrices for numerous real user equipments, for example by forming an average from the calculated channel covariance matrices. The real user equipments may be such presently being served, such as those that are transmitting using resource blocks in the received signal and may e.g. correspond to the multiple user equipments 120-1 ... 120-7. One common average channel covariance matrix may be formed for the real user equipments and then used for the virtual user equipment. This although the real user equipments may transmit on different resource blocks distributed over the system bandwidth. The average may be formed also over time. In such case involving also, or only, involving user equipments that have been served previously by the base station 110. A statistically determined channel covariance matrix for the virtual user equipment may be advantageous to use when the receiver antenna 112 has correlated multiple antenna elements 112a-c and it therefore may be expected that the channel covariance matrices may comprise values corresponding to more frequently occurring directions.

Note that the estimate of interference and noise power of the uplink resource block may be calculated for a resource block, and thus corresponding frequencies, that presently are not scheduled to any user equipment, but potentially may be scheduled to a user equipment. Or in other words, calculated for a resource block that for the moment is not used in the uplink by the user equipment 120, or any one of the multiple user equipments 120-1 ... 120-7, but that should be considered for potential assignment to a user equipment.

The calculations described above for Actions 402-403, resulting in the estimate of interference and noise power of the uplink resource block, may be performed for each one of a number of uplink resource blocks that are to be considered for assignment to the user equipment 120, or the multiple user equipments 120-1 ... 120-7. Or in other words that are relevant candidates for uplink assignment. It is however not necessary to perform the calculations by repeating everything sequentially. Some of the underling calculations are the same for the resource blocks and thus need only be performed once. It is also possible to perform calculations in parallel, as will be recognized by the skilled person and also may be better understood from the more detailed examples regarding calculation that are presented separately below.

When to carry out actions 401-403, or at least 402-403 since the signal may be a signal that is received not merely for use with action 402-403, may be initiated by the base station when the estimate is needed or useful to provide. A new estimate may be provided repeatedly e.g. on every subsequently received signal for fast and best adaptation to changes, however, a new estimate may also be provided less often than that but may still be useful, e.g. if/when the interference and noise situation is static enough, so that a new estimate would not substantially differ from a previous one.

Action 404

Uplink resource blocks are assigned to the user equipment 120, or to respective one of the multiple user equipments 120-1 ... 120-7, while taking into account the respectively provided estimate. The assignment will thus take uplink IRC gains into consideration, which enable improved resource assignment when IRC is applied in the uplink. Also, as explained above, it enables more efficient use of FSS together with IRC in the uplink.

Action 405

Information is sent the user equipment 120, or respective one of the user equipments 120-1 ... 120-7, about the resulting actually assigned resource block or resource blocks for uplink transmission. In LTE this is accomplished by the scheduler sending a respective so called Uplink Grant on the downlink to each user equipment that have been assigned a resource block or resource blocks.

The real amount of interference suppression that may be obtained by IRC depends on the relative phase between the wanted signal and the interference and hence the exact interference level after IRC cannot be calculated in beforehand. However, the estimate provided by embodiments herein has proved to be useful as a measure of the result after IRC.

Figure 5:
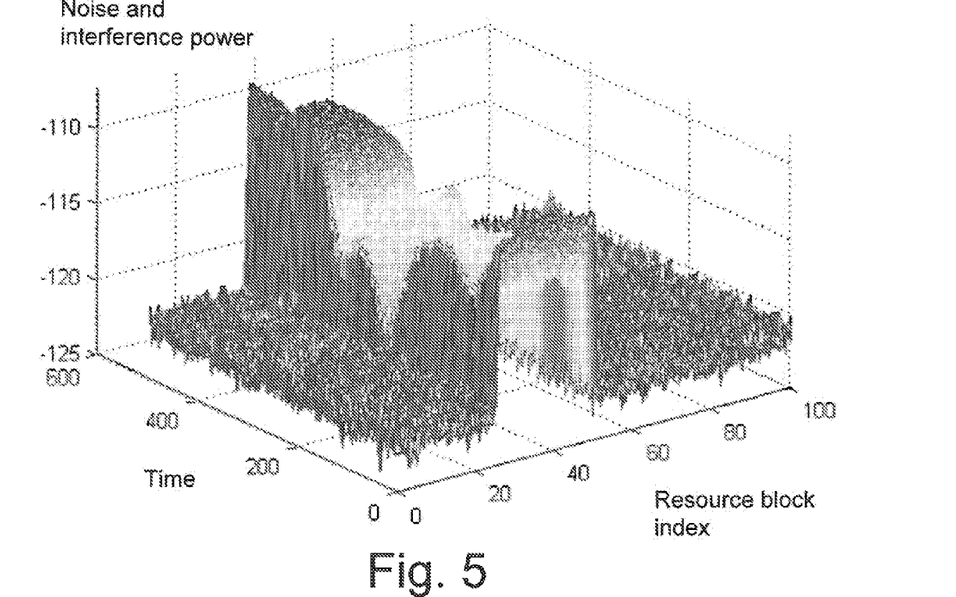
FIG. 5 is a diagram illustrating result when a conventional interference and noise power measurement method is used.
Figure 6:
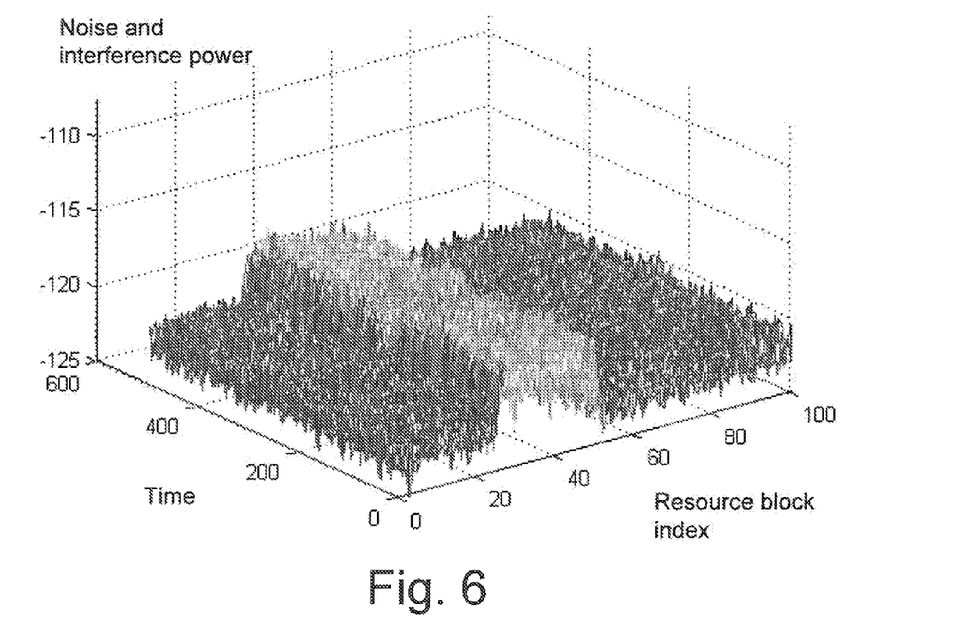
FIG. 6 is a diagram depicting a corresponding situation as in FIG. 5 but when embodiments herein are used for providing estimate of interference and noise power.

FIG. 5 illustrates the result when a conventional interference and noise power measurement method based on Maximum Ratio Combining (MRC) is used but thus, as discussed above, not taking into account if IRC is applied or not. This makes the method less suitable to be combined with uplink FSS. FIG. 6 on the other hand illustrates the result when embodiments herein are used for providing the estimate of interference and noise power. FIGS. 5 and 6 show the noise and interference power, along an axis corresponding to a z-axis, on a time-frequency grid, corresponding to a x-y plane. The axis in the x-y plane are time and resource block index, the latter corresponding to frequency owing to the correspondence between resource block and subband, or subcarrier, depending on which term preferred to use. The situation illustrated in FIGS. 5 and 6 corresponds to a scenario when there are no scheduled users present and there is one strong interferer originating from a neighboring cell. The fading of this interferer may be seen clearly in the conventional interference measurement approach while it is almost completely suppressed in the example according to embodiments herein.

The estimate provided by embodiments herein is thus a usable measure of interference and noise power that will result if IRC is applied by the base station to a signal received on a corresponding resource block. When IRC is being used in the base station, the estimate will provide a better basis for making FSS decisions than if interference and noise power is calculated conventionally for FSS.

Figure 7:
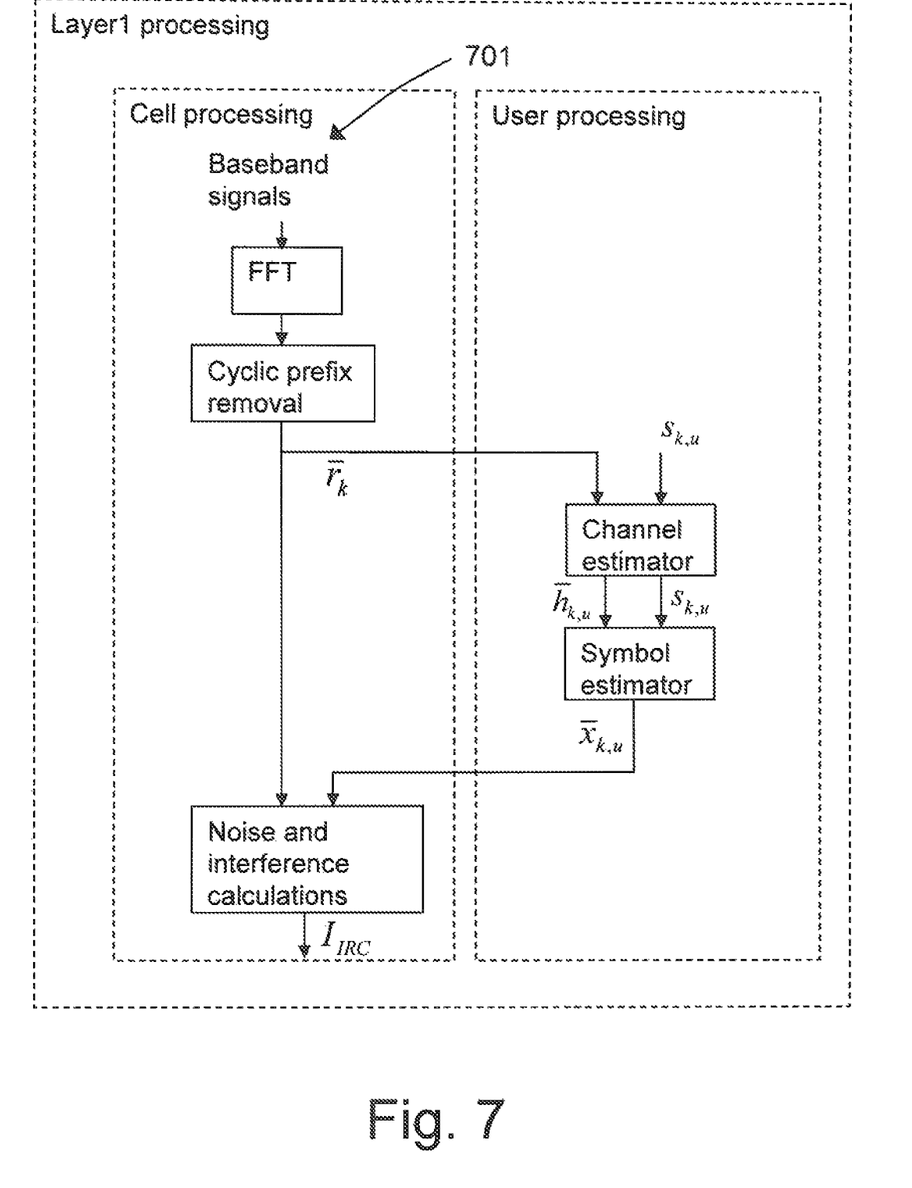
FIG. 7 is a schematic block diagram illustrating an exemplifying layout.
Figure 8:
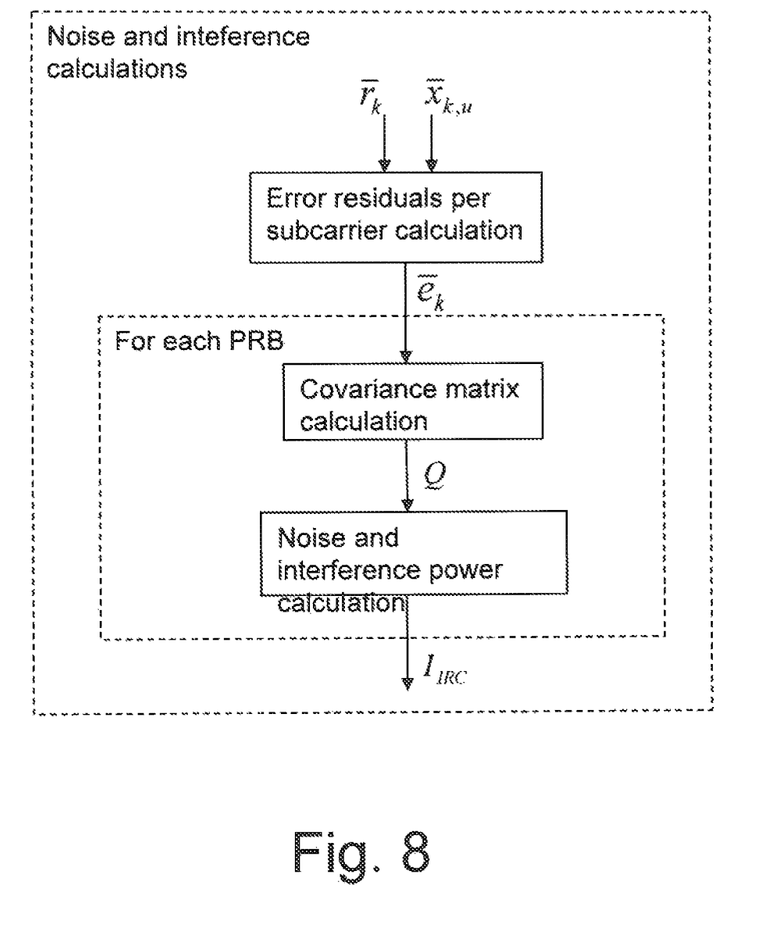
FIG. 8 is a schematic block diagram illustrating a block in FIG. 7 in further detail.

A detailed example of how the estimate may be derived and calculated will now follow, with some support from FIG. 7 and FIG. 8. These figures are schematic block diagrams illustrating an exemplifying layout in order to facilitate understanding of the different processing and signals involved in the detailed example and how these may relate to each other. As will be recognized by the skilled person, parts of the example and what is shown in FIGS. 5 and 6 relate to what may be identified as being LTE specific. However, this is only for exemplifying purposes and is not to be construed as limiting embodiments herein to LTE. The detailed example corresponds to a situation of multiple user equipments are transmitting in the uplink, such as when the multiple user equipments 120-1 . . . 120-7 are being served and scheduled by the base station 110, as discussed above.

As mentioned above, the received signal will typically contain a mixture of the energy from the scheduled user equipments and the noise and interference generated by electrical components and interfering users from neighboring cells. In the context of the example of FIG. 7, antenna reception and processing of the received signal prior to resulting in baseband signals are not shown, and the received signal after this has been marked 701 and corresponds to the basebands signals indicated in the figure. The first step is to extract the interference and noise by removing the signal energy associated with the user equipments 120-1 . . . 120-7, from the received signal. This may be performed for each subcarrier k (corresponding to frequency) according to:

$$\bar{e}_k = \bar{r}_k - \sum_{u=0}^{N_u-1} \bar{h}_{k,u} \cdot s_{k,u} = \bar{h}_{1,k} \cdot s_{1,k} + \bar{n}_k,$$

where $\bar{e}_k$ is a residual error signal vector for each subcarrier k. As mentioned above, this vector is of size of $1 \times N_A$ where $N_A$ is the number of antenna elements in the receiver antenna. $N_u$ is the number of user equipments scheduled in the transmission time interval corresponding to the received signal, i.e. corresponding to the number of user equipment 120, or user equipments 120-1 . . . 120-7, transmitting and thereby contributing with signal energy in the received signal. Note that the product sum $$x_k = \sum_{u=0}^{N_u-1} \bar{h}_{k,u} \cdot s_{k,u}$$

may be calculated already in the user processing step.

Note that in the situation described above, in case there is no signal in the received signal from any user equipment being served by the base station 110, the extracting of signal energy of course need not be performed, or will have no effect. However, as understood by the skilled person, this is a situation that may be expected to be rarely occurring in practice, at least when the estimate is provided for scheduling purposes, such as for FSS.

A noise covariance matrix Q of size $N_A \times N_A$ may then be built for each resource block (RB), i.e. group of subcarriers, by using the noise residuals of the subcarriers corresponding to this RB:

$$Q = \frac{1}{12} \sum_{k=12 \cdot RB}^{12 \cdot RB+11} \bar{e}_k^H \bar{e}_k,$$

where $\bar{e}_k^H$ denotes the Hermitian transpose of $\bar{e}_k$, and the number 12 relates to the number of subcarriers of each resource block (RB). The interference and noise power for each RB after IRC may be defined (in linear scale) as:

$$I_{IRC} = I_{MRC} \cdot \frac{SINR_{MRC}}{SINR_{IRC}},$$

where $I_{MRC}$ is the interference and noise power after MRC, and $SINR_{MRC}$ and $SINR_{IRC}$ is the signal to interference and noise ratio after MRC and IRC respectively. The interference and noise power after MRC may be defined as:

$$I_{MRC} = \frac{1}{N_A} \cdot Tr(Q),$$

where Tr is the matrix trace operation.

The SINRs after respective MRC and IRC may be estimated as:

$$SINR_{MRC} = \frac{Tr(H)}{I_{MRC}}$$

and $$SINR_{IRC} = Tr(H \cdot Q^{-1}),$$

where H is a channel covariance matrix. As discussed above, in embodiments herein there the channel covariance matrix being used is of the virtual user equipment. The channel covariance of the virtual user equipment is in the following termed Ĥ. The virtual user equipment may be viewed upon has having a purpose to provide a virtual signal that probes what gain IRC would give for a certain orientation of the signal relative to an interference signal. The orientation of the virtual signal may be determined in many different ways. One simple approach, as discussed above, is to set the channel covariance matrix to an identity matrix. A channel covariance matrix that is an identity matrix corresponds to the situation of having an user signal that is uncorrelated between the antenna branches.

Using $\hat{H} = I$ yields $SINR_{MRC} = \frac{N_A}{I_{MRC}}$ and $$SINR_{IRC} = Tr(Q^{-1})$$

The equations then finally boils down to the following formula for the estimate of interference and noise power per RB in case of application of IRC in the uplink:

$$I_{IRC} = \frac{1}{Tr(Q^{-1})/N_A}$$

Or, in general, with $\hat{H}$ remaining:

$$I_{IRC} = \frac{N_A}{Tr(\hat{H} \cdot Q^{-1})}$$

This estimate may be converted into dBm scale or any other scale useful for further processing, e.g. in the scheduler.

Note, with reference to FIG. 7, that when the channel covariance matrix $\hat{H}$ of the virtual user equipment is used when calculating the $I_{IRC}$ estimate, the calculations may be performed by cell processing, as illustrated by the location of the noise and interference power calculation block in the left, cell processing, block in FIG. 7. In case $\hat{H}$ would be determined per user equipment as would be a more normal situation for a channel covariance matrix, the noise and interference power calculation would need to be carried out in the user processing block. Performing it in the cell processing block, or in other words on a cell processing, or cell receiver, level enables a less complex and less computational intense implementation and may also facilitate implementation in a base station already supporting FSS.

Figure 9:
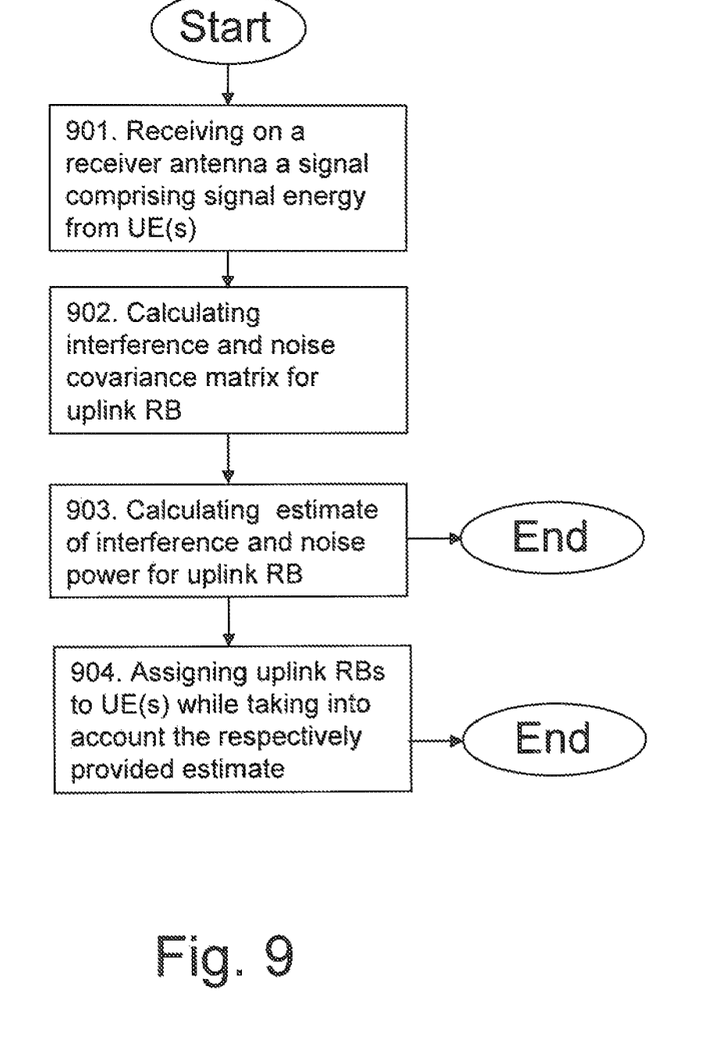
FIG. 9 is a flow chart illustrating embodiments of a method in a base station.

Embodiments herein relating to a method in the base station 110 for providing an estimate of interference and noise power of an uplink resource block, will now be further elaborated and described with reference to the flowchart depicted in FIG. 9. The base station 110 is comprised in the cellular communications network 100. The method comprises the following actions, which actions may be taken in any suitable order:

Action 901

The base station receives on the multiple antenna elements 112a-c of the receiver antenna 112 a signal. The signal comprises interference and noise.

In some embodiments the base station 110 serves one or more user equipments 120, 120-1 ... 120-7 comprised in the cellular communications network 100. In such embodiments the received signal may comprises signal energy from said one or more user equipments 120, 120-1 ... 120-7 in addition to the interference and noise.

This action may correspond fully or partially to the previously described action 401.

Action 902

The base station 110 calculates an interference and noise covariance matrix for the resource block based on the received signal.

This action may correspond fully or partially to the previously described action 402.

Action 903

The base station 110 calculates the estimate based on the calculated interference and noise covariance matrix, the number of the multiple antenna elements 112a-c of the receiver antenna 112 and a channel covariance matrix for a virtual user equipment. This action may correspond fully or partially to the previously described action 403.

The calculated estimate may correspond to:

$$I_{IRC} = \frac{N_A}{Tr(\hat{H} \cdot Q^{-1})},$$

where $N_A$ is the number of the multiple antenna elements 112a-c, $Q^{-1}$ is the inverse of the calculated interference and noise covariance matrix, $\hat{H}$ is the channel covariance matrix for the virtual user equipment, and Tr is a matrix trace operation.

In some embodiments the channel covariance matrix for the virtual user equipment is an identity matrix.

In some embodiments the channel covariance matrix for the virtual user equipment has been determined statistically based on calculated channel covariance matrices for numerous real user equipments. The channel covariance matrix for the virtual user equipment may be determined statistically by forming an average from the calculated channel covariance matrices for the numerous real user equipments.

In some embodiments the channel covariance matrices for the numerous real user equipments have been calculated for real user equipments 120, 120-1 ... 120-7 presently being served by the base station and/or real user equipments that have been served previously by the base station 110.

In some embodiments, the calculating is performed such that a respective estimate is provided for each one of a number of uplink resource blocks to be considered for assignment to one or more user equipments 120, 120-1 ... 120-7 being served by the base station (110).

This action may correspond fully or partially to the previously described action 403.

Action 904

This is an optional action for embodiments herein. The base station assigns the uplink resource blocks to said one or more user equipments 120, 120-1 ... 120-7 while taking into account the respectively provided estimate.

This action may correspond fully or partially to the previously described actions 404.

Figure 10:
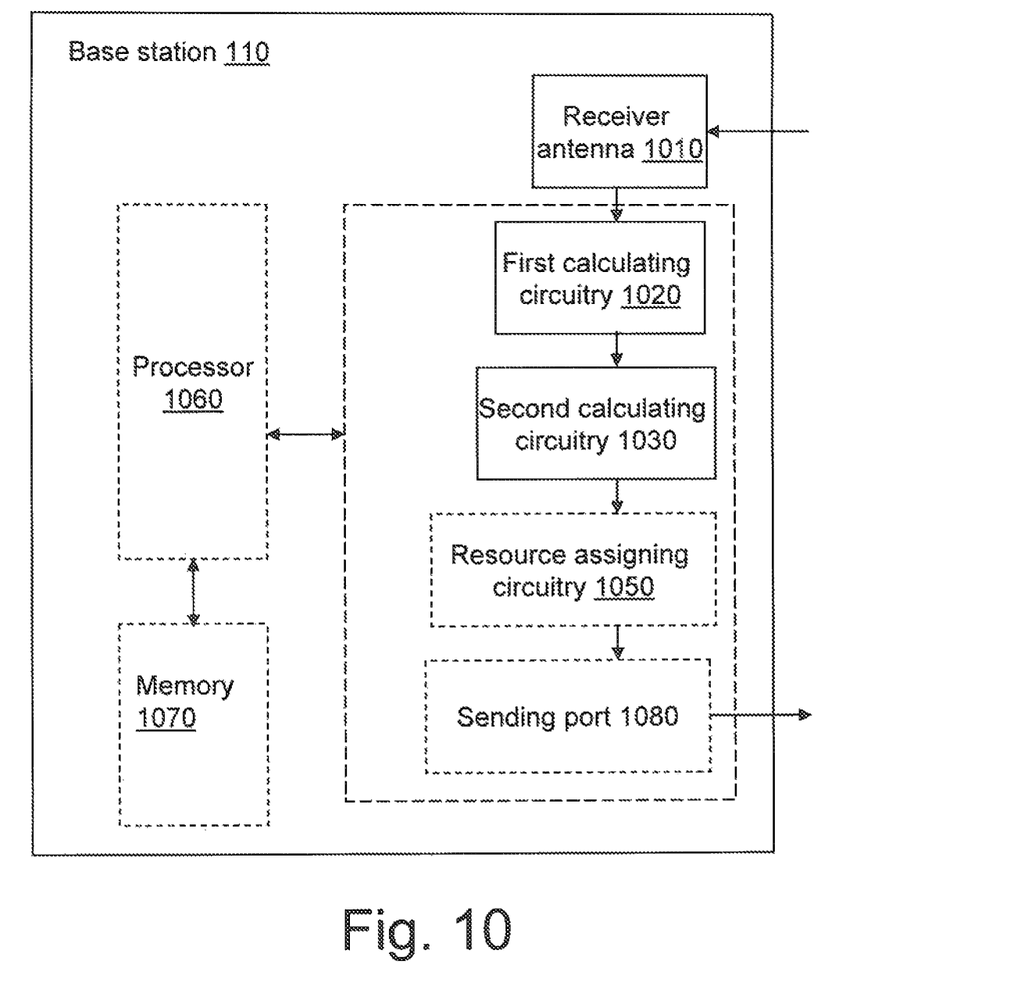
FIG. 10 is a schematic block diagram showing embodiments of a base station.

To perform the actions above for providing the estimate of interference and noise power of an uplink resource block, the base station 110 may comprise an arrangement schematically depicted in FIG. 10. The base station 110 is configured to serve one or more user equipments 120, 120-1 ... 120-7. The base station 110 and said one or more user equipments 120, 120-1 ... 120-7 are comprised in the cellular communications network 100.

The base station 110 comprises a receiver antenna 1010, corresponding to receiver antenna 112, configured to receive on the multiple antenna elements 112a-c thereof the signal comprising the interference and noise.

The base station 110 further comprises a first calculating circuitry 1020, configured to calculate the interference and noise covariance matrix for the resource block based on the received signal.

Moreover, the base station 110 comprises a second calculating circuitry 1030, configured to calculate the estimate based on the calculated interference and noise covariance matrix, the number of multiple antenna elements 112a-c of the receiver antenna 112, 1010 and the channel covariance matrix for the virtual user equipment.

In some embodiments, the first calculating circuitry 1020 and the second calculating circuitry 1030 are further configured to provide the respective estimate for each one of the number of uplink resource blocks to be considered for assignment to the one or more user equipments 120, 120-1 ... 120-7 being served by the base station 110.

Also, the base station 110 may further comprise a resource assigning circuitry 1050, configured to assign the uplink resource blocks to said one or more user equipments 120, 120-1 ... 120-7 while taking into account the respectively provided estimate. The resource assigning circuitry typically corresponds to the scheduler discussed in the foregoing.

The base station 110 may typically also comprise a sending port 1080, configured to send information about the assigned resource blocks to the one or more user equipments 120, 120-1 ... 120-7.

The embodiments of the base station 110 may be implemented through one or more processors, such as a processor 1060 in the base station 110 depicted in FIG. 10, together with computer program code for performing the functions and actions of embodiments herein. In some embodiments the first calculating circuitry 1020 and/or the second calculating circuitry 1030 may be fully or partially implemented by the processor 1060.

The program code mentioned above may also be provided as a computer program product, for instance in the form of a data carrier carrying computer program code for performing the embodiments herein when being loaded into the in the base station 110. One such carrier may be in the form of a CD ROM disc. It is however feasible with other data carriers such as a memory stick or memory card. The computer program code may furthermore be provided as pure program code on a server and downloaded to the base station 110.

The base station 110 may further comprise a memory 1070 comprising one or more memory units. The memory 1070 is arranged to be used to store data, such as calculated final and intermediate results, such as the above mentioned matrices, estimates, user equipment requests, and configurations and applications to perform the method when being executed in the base station 110.

Those skilled in the art will also appreciate that the first calculating circuitry 1020, the second calculating circuitry 1030, the resource assigning circuitry 1050, and the sending port 1210 may refer to a combination of analog and digital circuits, and/or one or more processors configured with software and/or firmware (e.g., stored in memory) that, when executed by the one or more processors such as the processor 1060, perform as described above. One or more of these processors, as well as the other digital hardware, may be included in a single application-specific integrated circuit (ASIC), or several processors and various digital hardware may be distributed among several separate components, whether individually packaged or assembled into a system-on-a-chip (SoC).

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appending claims.

The invention claimed is:

1. A method in a base station for providing an estimate of interference and noise power of an uplink resource block, the base station being comprised in a cellular communications network, wherein the method comprises:
 receiving, on multiple antenna elements of a receiver antenna, a signal comprising interference and noise;
 calculating an interference and noise covariance matrix for the resource block, based on the received signal; and
 calculating the estimate based on the calculated interference and noise covariance matrix, the number of the multiple antenna elements of the receiver antenna, and a channel covariance matrix for a virtual user equipment, wherein the calculated estimate corresponds to:

$$I_{IRC} = \frac{N_A}{Tr(\hat{H} \ Q^{-1})},$$

where $N_A$ is the number of the multiple antenna elements, $Q^{-1}$ is the inverse of the calculated interference and noise covariance matrix, $\hat{H}$ is the channel covariance matrix for the virtual user equipment, and Tr is a matrix trace operation.

2. The method of claim 1, wherein the channel covariance matrix for the virtual user equipment is an identity matrix.

3. The method of claim 1, wherein the channel covariance matrix for the virtual user equipment has been determined statistically based on calculated channel covariance matrices for numerous real user equipments.

4. The method of claim 3, wherein the channel covariance matrix for the virtual user equipment has been determined statistically by forming an average from the calculated channel covariance matrices for the numerous real user equipments.

5. The method of claim 3, wherein the channel covariance matrices for the numerous real user equipments have been calculated for real user equipments presently being served by the base station and/or real user equipments that have been served previously by the base station.

6. The method of claim 1, wherein the calculating is performed such that a respective estimate is provided for each one of a number of uplink resource blocks to be considered for assignment to one or more user equipments being served by the base station.

7. The method of claim 6, wherein the method further comprises assigning uplink resource blocks to said one or more user equipments while taking into account the respectively provided estimate.

8. The method of claim 1, wherein the base station is serving one or more user equipments comprised in the cellular communications network and the received signal comprises signal energy from said one or more user equipments in addition to the interference and noise.

9. A base station for providing an estimate of interference and noise power of an uplink resource block, the base station being comprised in a cellular communications network, wherein the base station comprises:
 a receiver antenna, configured to receive, on multiple antenna elements thereof, a signal comprising interference and noise;
 a first calculating circuitry, configured to calculate an interference and noise covariance matrix for the resource block based on the received signal; and
 a second calculating circuitry, configured to calculate the estimate based on the calculated interference and noise covariance matrix, the number of the multiple antenna elements of the receiver antenna and a channel covariance matrix for a virtual user equipment, wherein the calculated estimate corresponds to:

$$I_{IRC} = \frac{N_A}{Tr(\hat{H} \ Q^{-1})},$$

where $N_A$ is the number of antenna elements, $Q^{-1}$ is the inverse of the calculated interference and noise covariance matrix, $\hat{H}$ is the channel covariance matrix for the virtual user equipment, and Tr is a matrix trace operation.

10. The base station of claim 9, wherein the channel covariance matrix for the virtual user equipment is an identity matrix.

11. The base station of claim 9, wherein the channel covariance matrix for the virtual user equipment has been determined statistically based on calculated channel covariance matrices for numerous real user equipments.

12. The base station of claim 11, wherein the channel covariance matrix for the virtual user equipment has been determined statistically by forming an average from the calculated channel covariance matrices for the numerous real user equipments.

13. The base station of claim 11, wherein the channel covariance matrices for the numerous real user equipments have been calculated for real user equipments presently being served by the base station and/or real user equipments that have been served previously by the base station.

14. The base station of claim 9, wherein the first calculating circuitry and second calculating circuitry are further configured to provide a respective estimate for each one of a number of uplink resource blocks to be considered for assignment to one or more user equipments being served by the base station.

15. The base station of claim 14, wherein the base station further comprises a resource assigning circuitry, configured to assign uplink resource blocks to said one or more user equipments while taking into account the respectively provided estimate.

16. The base station as claimed claim 9, wherein the base station is further configured to serve one or more user equipments comprised in the cellular communications network and wherein the signal comprises signal energy from said one or more user equipments in addition to the interference and noise.

\* \* \* \* \*